Figure 1:

Jan. 13, 1959  D. F. ALLISON  2,869,057
ELECTRIC CURRENT RECTIFIER
Filed May 2, 1955

INVENTOR
DAVID F. ALLISON
BY Henry Kolin
AGENT

United States Patent Office 2,869,057
Patented Jan. 13, 1959

2,869,057

ELECTRIC CURRENT RECTIFIER

David F. Allison, Fort Lee, N. J., assignor to International Telephone and Telegraph Corporation, Nutley, N. J., a corporation of Maryland Application May 2, 1955, Serial No. 505,197

6 Claims. (Cl. 317—237)

This invention relates to electric current rectifiers and to methods of making them and, in particular, is directed to methods for preparing a magnesium telluride rectifier.

Dry-disk rectifiers of the selenium, copper oxide and magnesium-copper sulfide type are well known and useful for many varied applications. The selenium rectifier, in particular, has come into widespread use because of its ability to handle efficiently very large currents at voltages in excess of at least 40 volts root mean square. However, the selenium rectifier is not considered suitable for sustained operation at ambient temperatures in excess of 150° C. The magnesium-copper sulfide rectifier is considered operable at temperatures as high as 200° C.; however, this rectifier shows a considerably poorer efficiency than the selenium rectifier and has a considerably shorter life. The need therefore exists for an efficient, dry-disk area-type rectifier capable of handling large currents at elevated temperatures, particularly 250° C. or higher.

Attempts have been made heretofore to prepare high-temperature rectifiers in a manner similar to that used for selenium rectifiers, but using tellurium as the semiconductor element because of its considerably higher melting point. However, these attempts have been unsuccessful and incapable of yielding a product or method suitable for large scale production. In general, the higher conductivity of tellurium as compared with selenium does not lend itself to the formation of an electric current rectifier based on the selenium pattern as such. Other attempts have been made to prepare a dry-disk rectifier in which tellurium is used as the active element and the rectifier is patterned after the magnesium-copper sulfide type. These rectifiers are disclosed, for example, in U. S. Patents 1,826,955 and 1,866,351. In these methods a magnesium disk is anodically oxidized and maintained under pressure against a tellurium element to obtain rectification. While such arrangements result in the obtaining of rectification, the rectifiers produced thereby are relatively inefficient and unstable, with high forward resistances, because of the requirement for maintaining a pressure contact and also because of the relatively poor adhesion of the tellurium to the anodized magnesium surface. Furthermore, the presence of the insulating magnesium oxide layer between the tellurium and magnesium surfaces is, in of itself, actually objectionable.

It is an object of the present invention to provide an electric current rectifier of the dry-disk type having a forward conductivity considerably in excess of known selenium rectifiers.

It is a further object to provide such a rectifier capable of sustained operation at temperatures in excess of 250° C.

It is still a further object to provide a method for obtaining the aforesaid rectifiers wherein a rectifier having stable, uniform properties is produced.

It is still a further object to provide a method readily adaptable to the large-scale production of electric current rectifiers of this type.

As a feature of this invention, a magnesium telluride rectifier is provided in which an adherent, continuous layer of magnesium telluride is provided between adjacent magnesium and tellurium interfaces. It is a more specific feature of this invention that a temperature in excess of 300° C. is employed to form this magnesium telluride layer in situ.

Figure 2:
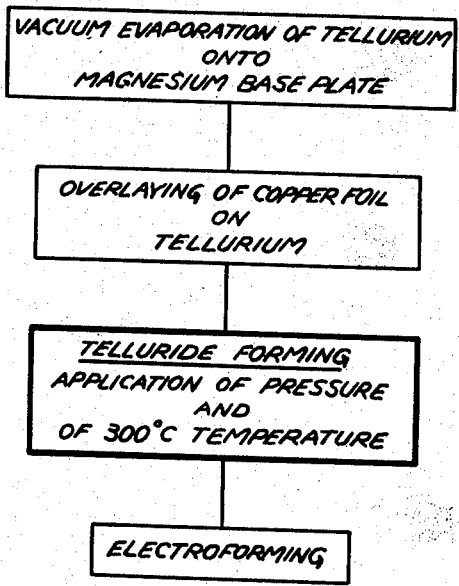

The above-mentioned and other features and objects of this invention will become more apparent by reference to the following description taken in conjunction with the accompanying drawings, in which:

Fig. 1 represents a cross section of a rectifier showing one embodiment of the invention; and Fig. 2 represents a flow chart of the essential features of one embodiment of the process of this invention with particular reference to a magnesium telluride rectifier.

For purposes of illustration, the processing of a typical magnesium telluride rectifier as embodied in Figs. 1 and 2 will be described hereinafter in greater detail. In Fig. 1 the base plate element 1 consists of high purity magnesium or of certain alloys thereof in which the magnesium constitutes approximately 90% of the alloy composition, the balance being selected from the metals aluminum, zinc, manganese and tin. The magnesium alloys such as alloy M1, consisting of approximately 98.5% magnesium and 1.5% manganese, and alloy FS1, consisting of 3% aluminum, 1% zinc and 0.3% manganese, with the balance magnesium, are among those considered suitable. The magnesium base plate 1 is cleaned in a typical degreasing solvent and then etched in a suitable solution in order to promote subsequent adherence of the tellurium layer. Dilute solutions of formic acid or of nitric acid are desirable etchants in this respect. The etched magnesium plate is inserted in a vacuum chamber containing finely divided tellurium in a molybdenum boat, and a layer of tellurium is deposited upon the etched magnesium plate using the technique of vacuum evaporation. This tellurium layer is shown as layer 3 in Fig. 1. While other methods of providing a tellurium layer upon the magnesium plate, such as a pressed-powder method, may be used, I have found that superior results with respect to adherence of the tellurium and lowered forward resistivity of the rectifier are obtained when the tellurium is deposited by means of vacuum evaporation. A thin copper foil 5 is then placed upon the evaporated tellurium layer, and the magnesium-tellurium-copper unit is placed in a heated press. At this stage, rectification is feeble and no magnesium telluride can be detected by chemical spot tests or otherwise. A pressure of approximately 10–50 tons per square inch is applied for approximately five minutes while maintaining the assembly at a temperature between 300 and 400° C. I have found that it is essential for the proper formation of an efficient magnesium telluride rectifier that a temperature above 300° C. be used in the formation of the magnesium telluride layer 2. At temperatures below this, such as 200° C. for example, while rectification is obtained, incomplete and non-uniform formation of magnesium telluride occurs. Such improperly formed rectifiers show a greater tendency to short out or have a conductivity in the forward direction that is in no way superior, and frequently inferior, to that obtained with selenium rectifiers. It is the "in situ" formation of this uniform or continuous layer of magnesium telluride 2 between, and in intimate contact with, the magnesium base plate 1 and the tellurium layer 3 which is considered critical for obtaining the markedly superior rectification properties. Similarly, in order to obtain a suitably adherent counter electrode layer 5, the formation of a corresponding high-conductive telluride layer 4, such as the copper telluride layer formed in the embodiment shown, leads to an improved rectification system. While other metallic foils may be used other than copper, such as lead for example, which react with tellurium to form a low-resistance ohmic contact, I have found that the reactivity of the copper foil with the tellurium at the pressing temperatures used results in formation of a copper-rich telluride layer, with excellent adherence of the copper electrode to the tellurium. The formation of the telluride layer 4, while preferable, is not considered critical for the purposes of this invention. The method described for providing the counter electrode layer 5 is preferred to other methods such as metallic spraying.

The rectification properties of the rectifier are enhanced and stabilized by subjecting the rectifier to an electrical forming treatment. One such suitable treatment consists of passing alternating current through the rectifier in series with a resistive load while maintaining the direct-current output substantially constant. As the electrical forming continues, the output current shows a tendency to rise because of the increase in reverse resistance. As the applied alternating voltage is gradually increased, the series resistance is increased so that a constant output current is maintained. Direct-current forming may also be used.

It should be pointed out that the functioning of the herein described rectifier is not believed to depend upon the formation of a high resistance barrier layer between magnesium and tellurium. I have found, for example, that if an anodized magnesium electrode is used in the practice of this invention, the forward conductivity obtained is considerably poorer than obtained by using an etched unoxidized magnesium electrode. It is believed that rectification is due to the semiconductive properties of the in situ formed magnesium telluride rather than to the magnesium telluride functioning as a high resistance barrier between the magnesium and tellurium surfaces. Inasmuch as tellurium is an intrinsic semiconductor at room temperature, the rectification efficiency obtained at high temperatures with this rectifier would be difficult to explain using a model of a tellurium-magnesium contact alone. The rectification system obtained is unique and superior to those hitherto known or obtained in that plates have been made having more than 40 times the forward conductivity of selenium cells of equivalent area. The reverse voltage ratings are of the order or approximately 10 volts at room temperature. The rectifiers may also be operated advantageously at temperatures as high as 400° C. These rectifiers then are particularly useful as high current, low voltage, high temperature, dry-disk rectifiers.

While I have described above the principles of my invention in connection with specific materials and method steps, it is to be clearly understood that this description is made only by way of example and not as a limitation to the scope of my invention as set forth in the objects thereof and in the accompanying claims.

I claim:
1. An electric current rectifier comprising a layer of magnesium, a layer of tellurium, a layer of magnesium telluride interposed between and in intimate contact with the interfaces of said layers of magnesium and tellurium, and a layer of conductive material, the interface portion of said tellurium and said conductive layer comprising a telluride of said conductive material.

2. A rectifier according to claim 1, wherein said conductive material comprises copper and said telluride comprises copper telluride.

3. A method of preparing a dry-disk magnesium telluride rectifier consisting of depositing a layer of tellurium on a magnesium base plate, disposing a conductor on said tellurium layer, and forming in situ a continuous layer of magnesium telluride between and in intimate contact with the interfaces of the magnesium and tellurium and also forming in situ a telluride of said conductive material with tellurium between and in intimate contact with the interfaces of said tellurium and said conductor by subjecting said plate to a pressure of at least 10 tons per square inch at a temperature in excess of 300° C.

4. A method according to claim 3, in which said pressure is maintained between 10 and 50 tons per square inch and said temperature is maintained between 300 and 400° C.

5. A method according to claim 3, in which said conductor is in the form of an overlying layer of copper.

6. A method of preparing a dry-disc magnesium telluride rectifier comprising depositing a layer of tellurium on a magnesium base plate and subjecting said layer to a pressure of at least ten tons per square inch at a temperature of in excess of 300° C., said magnesium being selected from the magnesium alloys consisting of the magnesium alloy consisting of approximately 98.5 percent magnesium and 1.5 percent manganese, and the magnesium alloy consisting of approximately 3 percent aluminum, 1 percent zinc and 0.3 percent manganese, with the balance magnesium.

References Cited in the file of this patent

UNITED STATES PATENTS

| Number | Name | Date |
|---|---|---|
| 1,826,955 | Ruben | Oct. 13, 1931 |
| 1,866,351 | Hollmageletal | July 5, 1932 |
| 2,189,576 | Brunke | Feb. 6, 1940 |
| 2,221,614 | Siebert | Nov. 12, 1940 |
| 2,223,203 | Brunke | Nov. 26, 1940 |
| 2,342,278 | Herrmann | Feb. 22, 1944 |
| 2,438,923 | Kotterman | Apr. 6, 1948 |
| 2,551,048 | Peters | May 1, 1951 |
| 2,653,879 | Fink | Sept. 29, 1953 |
| 2,740,925 | Escoffery | Apr. 3, 1956 |